United States Patent
LoGalbo et al.

(10) Patent No.: US 7,408,931 B2
(45) Date of Patent: Aug. 5, 2008

(54) METHODS FOR DELIVERY IN A WIRELESS COMMUNICATIONS NETWORK

(75) Inventors: Robert D. LoGalbo, Rolling Meadows, IL (US); Randy L. Ekl, Lake Zurich, IL (US); Ron Rotstein, Arlington Heights, IL (US); Christopher G. Ware, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 590 days.

(21) Appl. No.: 11/025,613

(22) Filed: Dec. 29, 2004

(65) Prior Publication Data

US 2006/0140186 A1  Jun. 29, 2006

(51) Int. Cl.
*H04L 12/28* (2006.01)
*H04L 12/56* (2006.01)

(52) U.S. Cl. .................. 370/390; 370/348; 370/468; 370/412; 370/413

(58) Field of Classification Search ............... 370/312, 370/442, 390, 389, 392, 412, 413, 348, 468, 370/338, 352, 331, 337, 465, 355
See application file for complete search history.

(56) References Cited

U.S. PATENT DOCUMENTS 6,574,770 B1 * 6/2003 Daudelin ................ 714/776
6,987,780 B2 * 1/2006 Wei et al. ................ 370/469
7,251,232 B1 * 7/2007 Meier ..................... 370/338
2005/0036466 A1 * 2/2005 Malik et al. ............. 370/338
2005/0058151 A1 * 3/2005 Yeh ........................ 370/445
2006/0092868 A1 * 5/2006 Meier ..................... 370/312
2006/0114826 A1 * 6/2006 Brommer ................ 370/230
2007/0217385 A1 * 9/2007 Meier ..................... 370/338

* cited by examiner

*Primary Examiner*—Edan Orgad
*Assistant Examiner*—Chuong Ho
(74) *Attorney, Agent, or Firm*—Randi L. Karpinia; Indira Saladi

(57) ABSTRACT

Methods for delivery of multicast packets in a wireless communication system are disclosed. The methods comprise transmitting a contention free period initiation signal from an access point to the station, transmitting broadcast packets from the access point to the station, transmitting multicast packets from the access point to the station and holding the multicast packets in storage after the transmission, transmitting a contention free period end signal from the access point to the station, determining if a negative acknowledgement message has been received, retransmitting the multicast packets in response to receiving a negative acknowledgment message, and eliminating the multicast packets at a next beacon interval.

14 Claims, 3 Drawing Sheets

METHODS FOR DELIVERY IN A WIRELESS COMMUNICATIONS NETWORK

FIELD OF THE INVENTION

This disclosure relates to methods for delivery in a wireless communications network.

BACKGROUND

The Institute of Electrical and Electronics Engineers (IEEE) has produced a series of standards referred to as 802.X, which encompasses LANs (Local Area Networks), MANs (Metropolitan Area Networks) and PANs (Personal Area Networks) such as Bluetooth. The IEEE 802 dictates standardizing processes and procedures that take place in the bottom two layers of the OSI (Open System Interconnection) reference model—the media access control (MAC) sublayer of the link layer and the physical layer.

In the wireless local area network (WLAN) topology, each wireless network requires a radio transceiver and antenna. Components on the wireless network are either stations (STAs) or access points (APs). Typically, a station STA is mobile or portable, and the access point AP may be a permanent structure analogous to a base station tower used in cellular phone networks or to a hub used in a wired network. A basic service set (BSS) is formed when two or more stations have recognized each other and established a network. An extended service set (ESS) is formed when BSSs (each one comprising an AP) are connected together.

FIG. 1 illustrates the basic service set BSS 1 operating in the infrastructure mode, wherein a wireless network is formed between one or more stations (STA) 2 communicating with an access point (AP) 4 such as a communications tower. The access point acts as an Ethernet bridge and forwards the communications onto the network (e.g., either wired or wireless network). Several such BSS networks communicating together over the infrastructure between APs further form an Extended Service Set (ESS), or a Distribution System (DS).

Stations 2 are typically mobile or portable devices powered by batteries. Accordingly, power consumption of the stations is important to manage in order to extend operational life of stations 2 without requiring new batteries. The problem is to deliver multicast and broadcast packets in such a way as to minimize current drain in stations 2, while maintaining high spectral efficiency.

In the 802.11 standard today, an inefficient current-drain-saving means of delivering multicast and broadcast packets to stations exists. This method in the 802.11 standard is as follows. A beacon is delivered at regular periodic and predictable intervals. The stations that are not active in a call enter a low power mode, e.g. sleep, between beacons. The stations know when the next beacon will arrive because the arrival time of the next beacon is signaled in the current beacon. The stations awake at every beacon interval to read the DTIM signal present in every beacon. The DTIM will signal whether broadcast and multicast packets shall be delivered immediately after the beacon. If broadcast and multicast packets are to be delivered in this beacon interval, all stations shall stay awake to hear the delivery of broadcast and multicast packets. In each broadcast/multicast packet transmitted a more data control bit exists; if that bit is set in the broadcast/multicast packet, the stations stay awake to continue receiving broadcast/multicast packets; if not, all the stations will resume the low power mode, e.g. sleeping. If broadcast and multicast packets are not to be delivered in this beacon interval, all stations will resume the low power mode, e.g. sleeping.

There are some problems in this design. The delivery of the multicast/broadcast packets after the DTIM can be interrupted by inbound unicast transmissions. This will delay the delivery of the multicast/broadcast packets, keeping the stations awake longer than necessary. Because the stations don't know if all of the broadcast/multicast packets have been delivered until the more data bit is clear, the stations must stay awake for delivery of all of the multicast/broadcast packets. It is not mandatory that the multicast and broadcast packets be transmitted OTA in order of priority or even in order of arrival at the AP. As a result, the station must stay awake until all of the multicast/broadcast packets are delivered to ensure reception of all pertinent packets. Yet another problem is over the air packet error. In a typical 802.X system, over the air packet error is approximately 10%, and the system ensures delivery using an ACK based protocol. In such a system, the 802.X standard does not provide for reliable delivery of multicast frames and thus delivery of multicast packets is not ensured. Not having reliable delivery of multicast packets requires the station to stay awake to ensure reception of pertinent packets. Accordingly, there is a need for delivery in wireless communication networks.

BREIF DESCRIPTION OF THE DRAWINGS

Refer now to figures, which are exemplary, not limiting, and wherein like elements are numbered alike in several figures and, as such may not be discussed in relation to each figure.

DETAILED DESCRIPTION

Figure 2:
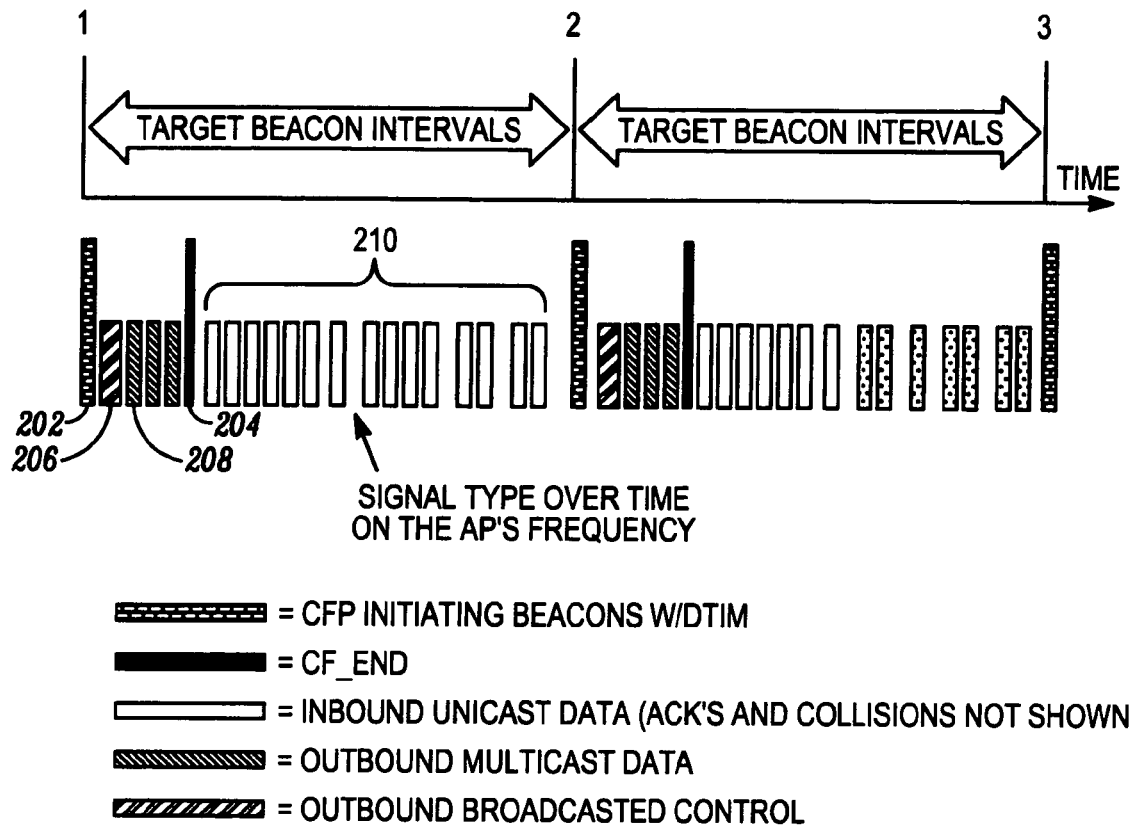
FIG. 2 illustrates exemplary signal transmissions between the access point and stations.

FIG. 2 illustrates an exemplary signal transmission from an AP 4. Included in the DTIM beacon from the AP 4 is a contention free period (CFP) start indication which signals all stations 2 to halt transmissions. The CFP initiate signal 202 prohibits all stations 2 within listening range from transmitting until the end of the CFP is signaled with a CF_END signal 204. When the AP 4 transmits a beacon, both the CFP start signal and the DTIM signal are in that beacon. Stations 2 see the DTIM and stay awake to hear the outbound broadcast packets 206 and outbound multicast packets 208. In exemplary embodiments, the multicast packets 208 are voice, but may be other data such as video or and any other real time application; the broadcast packets 206 may be call control signals The delivery of the broadcast/multicast packets from the AP 4 would be uninterrupted by inbound unicast transmissions because of the CFP initiate signal 202. Upon completion of the multicast/broadcast packet delivery, the AP 4 ends the CFP with the CF_END signal 204. After the CF_END signal 204, unicast transmissions sourced by both the access point and stations can commence and continue until the next beacon signals another CFP. It is not mandatory to use the CFP to deliver multicast and broadcast packets to stations in power savings mode. Rather, only DTIM's are the necessary element to deliver multicast and broadcast packets to stations in power savings mode. Further, the CFP is required to provide high reliability transfer of multicast data.

Another aspect of the invention involves using unused control fields. In IEEE 802.11E, a new field is introduced into the 802.11 MAC header, namely a quality of service (QoS) control field. Within this field is a subfield called the User Priority (UP) field. This carries the 802.1D priority of the packet to be delivered.

Figure 3:
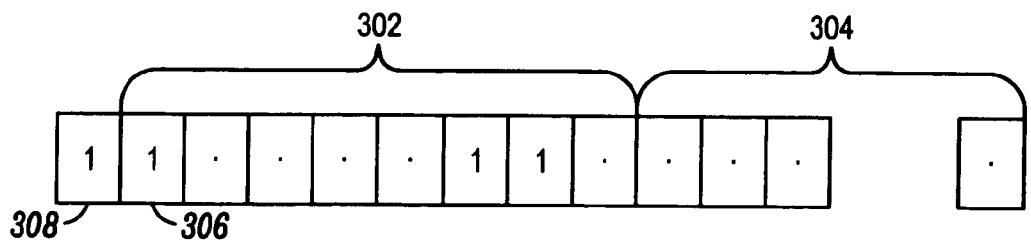
FIG. 3 depicts an exemplary control field.

Embodiments of the invention use the 802.1D priorities and create 8 UP queues for outbound broadcast packets and 8 UP queues for outbound multicast packets in the AP. Each queue is assigned a priority. In an embodiment, the broadcast queues are of a higher priority than the multicast queues. For example, multicast voice may have a high priority and multicast data a low priority. FIG. 3 shows an exemplary QoS control field 302 transmitted along with packets 304. It is understood that other control fields and data may be transmitted. An end of UP queue bit 306 indicates whether more packets are to be transmitted for that particular UP queue. A more data bit indicates whether there remains any more packets to be transmitted in lower priority queues. There is a more data bit for broadcast queues and another independent more data bit for multicast queues.

The system operates as follows. After the DTIM beacon, the AP 4 transmits the broadcast packets first, in order of highest to lowest UP; then transmits the multicast packets, in order of highest to lowest UP. The AP uses end of UP queue bit 306 to signify that all packets in the given UP queue have been transmitted and that the queue is empty. The more data bit 308 indicates whether any lower priority queues contain packets. This enables the station 2 to turn off as soon as possible when the AP 4 has transmitted all multicast and broadcast packets that have been buffered since the last beacon. Otherwise, the station 2 must wait to listen for an end of UP queue bit 306 to be set in at least one packet sourced from every queue up to the desired queue.

For example, assume station 2 was in a voice call while an image was being pushed down to it. Assume that voice would be in multicast queue UP=1 and that the image data would be in multicast queue UP=5. If the station 2 needed to listen for packets on multicast queue UP=1 and multicast queue UP=5, and if the station saw that the more data bit was clear on the last multicast packet from UP=2, it could turn off the receiver immediately. Otherwise, the AP 4 would need to transmit on all multicast queues UP=3 through UP=7 at least one multicast packet (a null packet) with the end of UP queue bit 306 set in each null packet.

Most of the time, stations 2 will not be in a call and be in idle mode. For example, when in idle mode, the stations 2 may necessarily need to only hear call control information in broadcast queue UP=1. Using embodiments of the invention, the stations 2 only need to wake up at the DTIM beacon, hear the broadcast packets in the first queue, and immediately return to low power mode, e.g. sleep.

Figure 1:
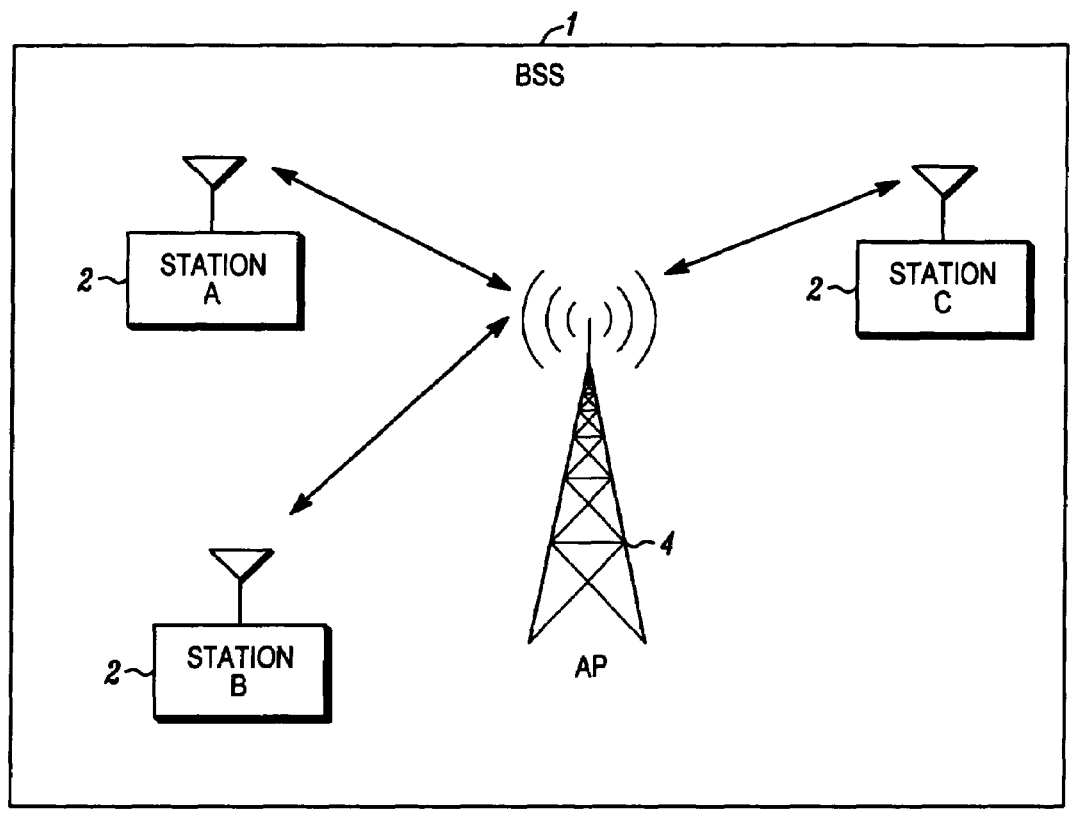
FIG. 1 is a block diagram illustrating a conventional WLAN system.

Another aspect of embodiments of the invention is management of inbound traffic (i.e., traffic from stations to the AP) based on traffic priority. There is a desire to segregate high priority inbound traffic (e.g., call initiation) to a fixed time interval and lower priority inbound traffic (e.g., voice or multimedia) to another time interval. Embodiments of the invention emulate a random access channel (RACH) for high priority traffic in the WLAN of FIG. 1.

As described above, a CFP is defined for the delivery of multicast/broadcast packets. In embodiments of the invention, a RACH initiate signal is transmitted by AP 4 after the last packet of lowest priority multicast and before the CF_END signal 204. The RACH initiate signal initiates the random access interval in which stations 2 transmit control data using a prioritization algorithm described below.

Existing 802.11 standards provide a prioritization scheme for prioritizing station transmissions. A station transmits a packet after sensing an open channel. However, the station first must wait a fixed length of time (FLT) and then wait a random number of slot times (RST) after the fixed length of time has expired to transmit on the channel. In proposed designs, packets to be transmitted are queued into 4 QoS Access Categories (AC's). The four AC's are Background, Best Effort, Video and Voice. Each AC has a Parameter Record that specifies (among other parameters), the fixed length of time for packets to wait before starting the random slot time counter ($FLT_{AC}$) and the minimum and maximum number of random slot times to wait before accessing the channel ($RST\_MIN_{AC}$ & $RST\_MAX_{AC}$). The highest priority AC is AC_VO or voice packets. It has the smallest FLT and the smallest RST_MIN & RST_MAX. Therefore a subscriber, with a packet from the AC_VO queue pending transmission, is more likely to access and send that voice packet over those subscribers that intend to transmit packets from lesser priority AC's.

Embodiments of the invention differ from the existing prioritization schemes by designating all inbound control under a new, higher priority Access Category referred to as AC_CTRL. The inbound control signals include both network control and call control. The existing AC_VO User Priorities (UP's) of 6 and 7 would be reapportioned. In embodiments of the invention, the highest priority (e.g., UP=7) is assigned to AC_CTRL and the second highest priority (e.g., UP=6) is assigned to AC_VO, with subsequent User Priorities (UP's) being assigned to Access Categories as deemed appropriate. The Access Category of AC_CTRL would include both network control and call control.

As is known, stations wait for a clear channel assessment before beginning the transmission sequence to access the channel. To give control signals a priority in obtaining access to a channel, the following parameters are used $FLT_{CTRL} < FLT_{VO}$,
$RST\_MIN_{CTRL} < RST\_MIN_{VO}$,
$RST\_MAX_{CTRL} < RST\_MAX_{VO}$, where FLT represents the Fixed Length of Time that a station must wait before starting the random slot time countdown and RST represents the Random Slot Time that must be waited until transmission. As evident from the relationships above, the control signals have a lower FLT and a lower RST range. By setting the FLT and RST in this manner, the inbound control signals have a higher probability of accessing and holding the channel than all other types of inbound unicast traffic, including voice. It should be noted that the application of this prioritization algorithm is not limited to the random access interval but can also be applied to the inbound transmission of the inbound unicast data packets (210) that occur after the CF_END (204) and before the beacon (202).

Another problem addressed by embodiments of the invention is the delivery of multicast packets in a timely and highly-reliable manner for voice services in a WLAN environment. Currently, in 802.11, multicast packets are transmitted only once, at the lowest rate, and are unacknowledged. Current 802.11 packets typically have a packet error rate (PER) of ~10%. For acceptable voice quality, the PER should be below 1.5%.

Embodiments of the invention use a multicast negative acknowledgment (NACK) message sent from a subscriber 2 to the AP 4 if the subscriber 2 determines that it has missed a voice frame, e.g. the subscriber did not receive a voice frame that it was expecting. As used herein, expecting means that the subscriber anticipates to receive multicast packets of a certain priority periodically. In an embodiment of the present invention, each access point has a number of queues from which the subscriber may receive multicast packets and each queue has a corresponding priority level.

For purposes of discussion, it is assumed that the control channel will be delivered in over the air (OTA) Layer 2 broadcast packets, and voice payload will be delivered to subscribers 2 in OTA Layer 2 multicast packets. The order of messages in one scenario is similar to that shown in FIG. 2 including a CFP Initiating Beacon 202, broadcast control data 206, multicast voice payload 208, CF_END 204. Once the CFP has ended, a subscriber 2 may send a multicast NACK signal to indicate a missed multicast packet. This NACK message is transmitted using existing standard contention based 802.X channel access mechanism. The AP 4 will then retransmit the multicast voice payload in response to the NACK message.

The NACK message may include a multicast group address, unicast address of the station, and type and subtype field set to indicate that this is a NACK message. The To/From DS bits are set 1/0, respectively.

The broadcast signaling, which carries the call control signaling (e.g., call setup data) is sent OTA first after the beacon. Stations receive this information, parse it, and determine that multicast voice packets will be destined to them at predictable periodic intervals. The multicast voice packets will immediately follow the beacon and broadcast frames, given the signaling structure shown in FIG. 2.

If a station 2 detects, from the beacon and/or broadcast information, that a multicast packet is expected, and that the multicast packet is not received, then at the first appropriate opportunity, station 2 sends a NACK message to the AP 4. Station 2 determines when to send a NACK if it receives any of a number of packets. For example, if station 2 receives a packet of lower priority than the one expected, if station 2 receives a CF_END before the one expected, or if station 2 detects any unicast traffic before the one expected, then station 2 determines the need to send a NACK The NACK message may include the priority of the missed multicast packet so the AP 4 knows which multicast queue contained the missed multicast packet. The first appropriate opportunity is at the end of the contention free period indicated by a CF_END signal 204 from the AP 4. The NACK message will be a message from the station 2 to the AP 4, sent to the AP's unicast address with the multicast group address of the missed multicast packet. The AP 4 will retransmit at least the missed multicast voice packets.

The AP 4 performs three additional processes. First, the AP 4 holds onto the voice multicast packets until the next beacon, in anticipation of retransmission. Second, the AP 4 needs to retransmit the voice multicast packet if it receives a NACK message for a particular multicast group. Third, the AP 4 needs to eliminate the multicast packet at the next beacon time. The AP 4 may increase the priority of the multicast retransmission, over whatever is in unicast queues such that retransmissions of multicast packet will have higher priority than any unicast transmission in the contention time. A unicast frame being transmitted will not be interrupted to send a retransmitted multicast packet. The availability of reliable multicast allows the AP 4 to transmit the multicast packet on a higher modulation/coding mode and save air resources and time. Specifically, the AP can send multicast at a rate that is not the lowest rate, and if a NACK message is received, retransmit that multicast packet at a lower rate.

Station 2 adopts two new processes. First, the station 2 ascertains from the beacon and broadcast control data that it is to get a multicast voice packet. Second, station 2 sends a NACK message if it does not get an expected multicast voice packet between the broadcast data 206 and CF_END 204. To keep multiple stations 2 from flooding the AP 4 and/or colliding on inbound NACK messages, randomized timers are used to backoff the initiation of NACK messages. Once a station 2 sees another poll or the retransmission of the multicast packet, it will cancel its NACK message timer.

Figure 4:
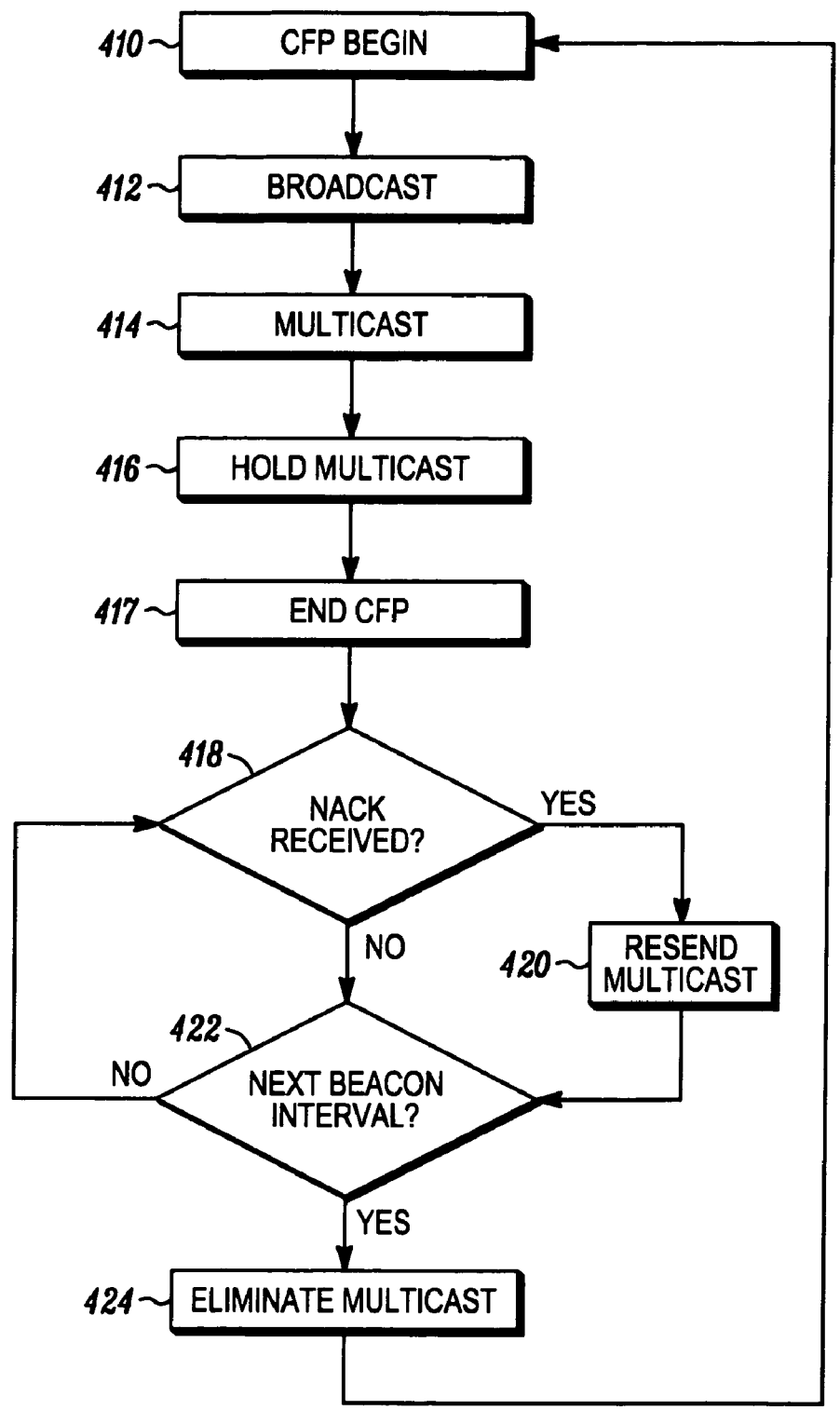
FIG. 4 is a flowchart of an exemplary process for resending multicast packets.

FIG. 4 is a flowchart of an exemplary process for resending multicast packets. The process begins at step 410 with the beginning of a new beacon interval and the transmission of the CFP initiate signal. Broadcast and multicast packets are transmitted at steps 412 and 414, respectively. The AP 4 holds the multicast packets at step 416 and determines if a NACK message has been received at step 418 where the NACK message is received after the end of the CFP as shown in step 417. If a NACK message has been received, the AP 4 retransmits the relevant multicast packets (e.g., the multicast packets of the priority identified in the NACK, the multicast group identified in the NACK, etc.). The AP 4 continues awaiting NACK messages until the next beacon interval occurs as shown in step 422. Once the next beacon interval arrives, the AP 4 eliminates the multicast packets in step 424. The flow then proceeds to step 410 where the process is repeated.

If there are two or more stations 2 that miss that same group's multicast voice payload frame, and assuming the two stations have backoff timers set to different values, one station's NACK message will get to the AP 4 first. The other stations 2 may see this NACK message, and those stations 2 will not need to send in their own NACK message. Further, if those other stations did not see the first station's NACK message, then they may see the retransmitted multicast voice packet, and determine they do not need to send a NACK message. Finally, if the stations 2 see neither the first NACK message nor the rebroadcast multicast voice packet, then these stations send their own NACK message.

If a station 2 misses a CF_END 204 to know when to access the channel, the station 2 may detect acknowledgement (ACK) messages sourced by the AP 4 in response to inbound unicast packets which would not be sent during the CFP, and therefore know that the CFP is over. If the NACK message is not received by the AP 4, the station 2 retransmits the NACK message if the station 2 does not see messaging from the AP for a certain time period. If the station 2 does not see the retransmitted multicast packet, the station 2 would retransmit the NACK message.

If the channel and timing is such that the NACK message and retransmission of missed multicast packet is not completed in time for the next beacon, then the multicast voice packet will be lost. Alternatively, the AP 4 may try retransmitting the multicast packet one last time, after the beacon and broadcast information, to send the prior multicast data, before eliminating it.

In alternate embodiments, one NACK triggers retransmissions of all of the broadcast and multicast packets at once. This will reduce overall congestion so that each station in the other multicast groups do not need to poll the AP. This embodiment sometimes occupies more capacity than necessary as all broadcast and multicast packets will not typically need to be retransmitted. This feature can be added to the use of NACK messages and can be optionally turned on via configuration or dynamically turned on if the system determines that there is a lot of retransmissions and/or a lot of contention. In an alternate embodiment, NACK triggers the transmission only from the broadcast and multicast queues that are associated to that station i.e. traffic classes or Access Categories that the station subscribed to via admission control.

Since the broadcast messages after the beacon need to be received by every station 2, embodiments of the invention may retransmit the broadcast on every NACK. If a station 2 has lost a multicast packet, it may have also lost the broadcast packet. The probability that one subscriber has lost the broadcast message is much greater than that of losing a multicast packet. As described above, embodiments may be in the form of computer-implemented processes and apparatuses for practicing those processes. In exemplary embodiments, the invention is embodied in computer program code executed by one or more network elements.

As understood by those in the art, the AP 4 and stations 2 include a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for reliable delivery of multicast packets in a wireless communication system, the method comprising:
   transmitting a contention free period initiation signal from an access point to the station,
   transmitting broadcast packets from the access point to the station from multiple queues, each queue having a priority, the broadcast packets being transmitted from a higher priority queue prior to transmitting broadcast packets from a lower priority queue, and transmitting an end of queue bit when all the broadcast packets for a queue have been transmitted;
   transmitting multicast packets from the access point to the station and holding the multicast packets in storage after the transmission;
   transmitting a contention free period end signal from the access point to the station;
   determining if a negative acknowledgement message has been received by the access point from the station, wherein the negative acknowledgement message is transmitted from the station to the access point when, prior to receiving the higher priority multicast packet, the station receives a lower priority packet, the contention free period end signal, and unicast traffic;
   retransmitting the multicast packets by the access point in response to receiving the negative acknowledgment message from the station; and
   eliminating the multicast packets by the access point at a next beacon interval.

2. The method of claim 1, wherein the transmitting broadcast packets further comprises:
   transmitting a more data bit indicating that there are no further broadcast packets in subsequent lower priority queues.

3. The method of claim 1 wherein the transmitting multicast packets further comprises transmitting the multicast packets from multiple queues, each queue having a priority, the multicast packets being transmitted from a higher priority queue prior to transmitting multicast packets from a lower priority queue.

4. A method for reliable delivery of multicast packets in a wireless communication system, the method comprising:
   transmitting a contention free period initiation signal from an access point to a station,
   transmitting broadcast packets from the access point to the station;
   transmitting multicast packets from the access point to the station from multiple queues, each queue having a priority, the multicast packets being transmitted from a higher priority queue prior to transmitting multicast packets from a lower priority queue, and further transmitting an end of queue bit when all the multicast packets for a queue have been transmitted;
   holding the multicast packets in storage after the transmission;
   transmitting a contention free period end signal from the access point to the station;
   determining if a negative acknowledgement message has been received by the access point from the station, wherein the negative acknowledgement message is transmitted from the station to the access point when, prior to receiving the higher priority multicast packet, the station receives a lower priority packet, the contention free period end signal, and unicast traffic;
   retransmitting the multicast packets by the access point in response to receiving the negative acknowledgment message from the station; and
   eliminating the multicast packets at a next beacon interval.

5. The method of claim 4, wherein the transmitting multicast packets further comprises:
   transmitting a more data bit indicating that there are no further multicast packets in subsequent lower priority queues.

6. A method for reliable delivery of packets in a wireless communication system, the method comprising:
   at a station:
      receiving a traffic indication message specifying that the station has traffic to receive;
      receiving packets from multiple queues, each queue having a priority, the packets being transmitted from a higher priority queue prior to transmitting packets from a lower priority queue;
      expecting at least one packet of a certain priority;
      entering a low power mode when the station receives the expected at least one packet wherein the expected at least one packet comprises an end of queue bit indicating that all the packets for a queue have been transmitted by an access point;
      determining that the station missed the expected at least one packet when, prior to receiving the expected at least one packet, the station receives a lower priority packet, a contention free period end signal, and unicast traffic; and sending a negative acknowledgement message, when the station determined that the station missed the expected at least one packet; and at the access point:

retransmitting the multicast packets in response to receiving the negative acknowledgment message from the station.

7. The method of claim 6 wherein the packet is a type chosen from the list comprising multicast and broadcast.

8. The method of claim 6,
wherein each received packet has a priority from multiple queues.

9. The method of claim 6 further comprising:
missing the expected at least one packet;
transmitting a negative acknowledgement message;
receiving the missed at least one expected packet; and
entering a low power mode.

10. The method of claim 9 further comprising awaking at a time when a next contention free period begins.

11. The method of claim 6 wherein expecting specifies that the station anticipates multicast packets of a certain priority level.

12. A method for saving station power in a wireless communication system, the method comprising:

at a station:

receiving a contention free period initiation signal receiving a traffic indication message specifying that the station has traffic to receive;

receiving broadcast packets from the access point to the station;

receiving multicast packets from the access point to the station from multiple queues, each queue having a priority, the packets being transmitted from a higher priority queue prior to transmitting packets from a lower priority queue;

expecting at least one multicast packet of a certain priority;

entering a low power mode, when the expected at least one multicast packet has been received, wherein the expected at least one packet comprises an end of queue bit indicating that all the packets for a queue have been transmitted by an access point;

determining that the station missed the expected at least one multicast packet;

receiving a contention free period end signal from the access point to the station;

sending a negative acknowledgement message, if the station determined that the station missed the expected at least one multicast packet; and receiving a retransmission of the at least one multicast packet from the access point, wherein the access point retransmits the at least one multicast packet in response to receiving the negative acknowledgement message, wherein the step of determining further comprises receiving (a) a packet of lower priority than the expected at least one multicast packet (b) a contention free period end signal, and (c) at least one unicast packet.

13. The method of claim 12 further comprising awaking at a time when a next contention free period begins.

14. The method of claim 12 further comprising entering a low power mode after receiving a retransmitted expected at least one multicast packet.

* * * * *